US010860581B2

United States Patent
Frazier et al.

(10) Patent No.: US 10,860,581 B2
(45) Date of Patent: Dec. 8, 2020

(54) APPARATUS AND METHOD OF FACILITATING A LOCAL DATABASE SYSTEM TO EXECUTE A QUERY FUNCTION AT A FOREIGN DATABASE SYSTEM

(71) Applicant: Teradata US, Inc., Dayton, OH (US)

(72) Inventors: John Douglas Frazier, Ramona, CA (US); Prama Agarwal, Irvine, CA (US)

(73) Assignee: Teradata US, Inc., San Diego, CA (US)

(*) Notice: Subject to any disclaimer, the term of this patent is extended or adjusted under 35 U.S.C. 154(b) by 340 days.

(21) Appl. No.: 15/839,955

(22) Filed: Dec. 13, 2017

(65) Prior Publication Data

US 2018/0173761 A1 Jun. 21, 2018

Related U.S. Application Data

(60) Provisional application No. 62/434,879, filed on Dec. 15, 2016.

(51) Int. Cl.
*G06F 17/00* (2019.01)
*G06F 16/2453* (2019.01)
(Continued)

(52) U.S. Cl.
CPC ...... *G06F 16/24542* (2019.01); *G06F 16/245* (2019.01); *G06F 16/256* (2019.01)

(58) Field of Classification Search
CPC .......................... G06F 17/30463; G06F 17/30
(Continued)

(56) References Cited

U.S. PATENT DOCUMENTS 4,200,930 A * 4/1980 Rawlings ............... G06F 13/385
709/212
6,226,649 B1 * 5/2001 Bodamer ............ G06F 16/2452
709/203
(Continued)

*Primary Examiner* — Usmaan Saeed
*Assistant Examiner* — Earl Levi Elias
(74) *Attorney, Agent, or Firm* — Michael Chan

(57) ABSTRACT

An apparatus is provided for facilitating a local database system to execute a query function at a foreign database system. The apparatus comprises a processor of the local database system and a storage device communicatively coupled with the processor. The processor is programmed to (i) receive a query request, (ii) retrieve query data associated with the query request, (iii) determine if the query request can be processed at the local database system, (iv) if the query request is unable to be processed at the local database system, connect to the foreign database system, (v) after the local database system is connected to the foreign database system, export the retrieved query data from the local database system to the foreign database system to allow the foreign database system to process the retrieved query data, (vi) after the retrieved query data has been exported from the local database system to the foreign database system, send the query request from the local database system to the foreign database system to allow the foreign database system to process the query request using the retrieved query data, and (vii) after the foreign database system has processed the query request using the query data, import a result dataset from the foreign database system.

16 Claims, 4 Drawing Sheets

(51) Int. Cl.
*G06F 16/25* (2019.01)
*G06F 16/245* (2019.01)

(58) Field of Classification Search
USPC .......................................................... 707/718
See application file for complete search history.

(56) References Cited

U.S. PATENT DOCUMENTS

| | | | | |
|---|---|---|---|---|
| 6,295,553 | B1* | 9/2001 | Gilbertson | .......... G06F 13/1657 |
| | | | | 709/207 |
| 2002/0161784 | A1* | 10/2002 | Tarenskeen | ........... G06F 16/214 |
| 2016/0342658 | A1* | 11/2016 | Skrzypczak | ...... G06F 16/24568 |

\* cited by examiner

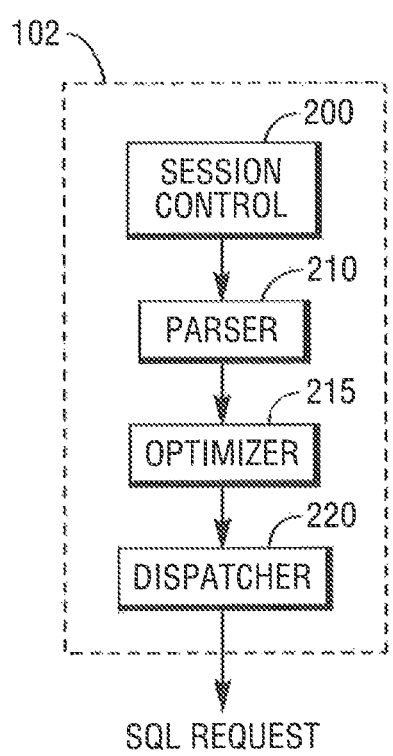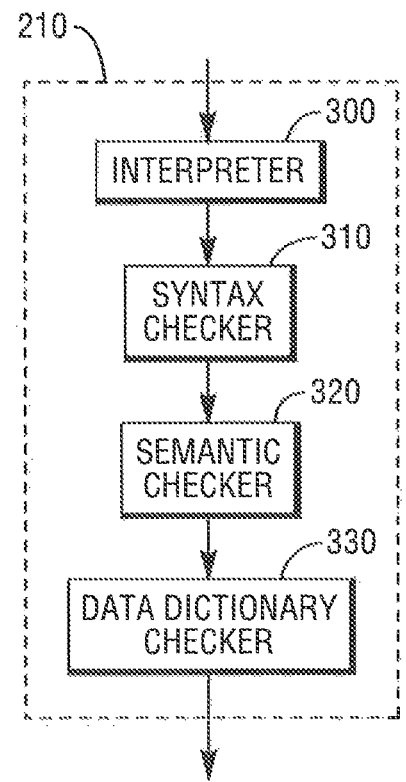

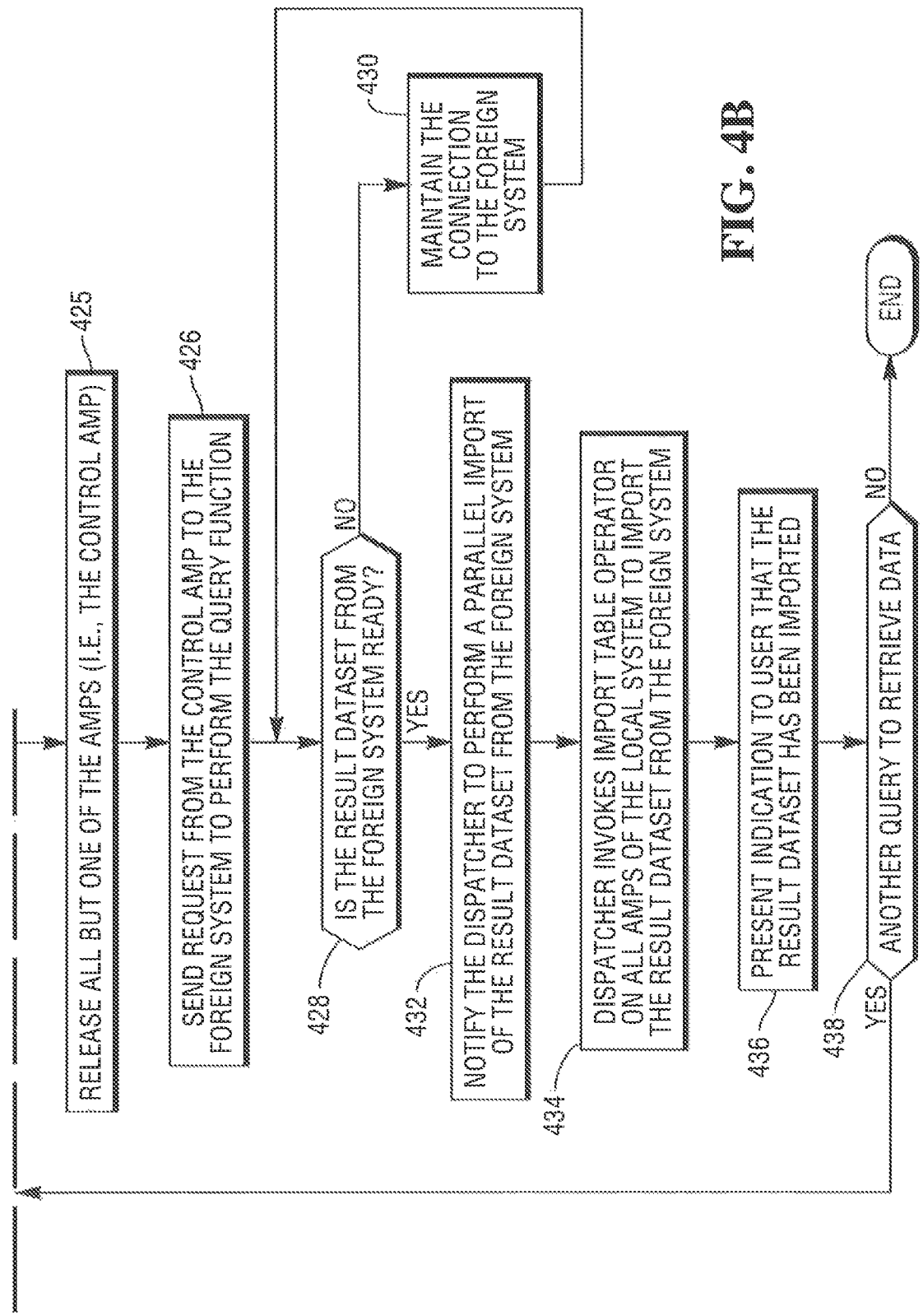

APPARATUS AND METHOD OF FACILITATING A LOCAL DATABASE SYSTEM TO EXECUTE A QUERY FUNCTION AT A FOREIGN DATABASE SYSTEM

CROSS REFERENCE TO RELATED APPLICATIONS

This application claims priority under 35 U.S.C. § 119(e) to U.S. Provisional Patent Application Ser. No. 62/434,879, entitled "Foreign Function Execution via SQL," filed on Dec. 15, 2016, by John Douglas Frazier and Prama Agarwal, which is incorporated herein by reference

TECHNICAL FIELD

The present disclosure relates to database systems, and is particularly directed to an apparatus and method of facilitating a local database system to execute a query function at a foreign database system.

BACKGROUND

A database of a database system is a collection of stored data that is logically related and that is accessible by one or more users or applications. A popular type of database is the relational database management system, which includes relational tables, also referred to as relations, made up of rows and columns (also referred to as tuples and attributes). Each row represents an occurrence of an entity defined by a table, with an entity being a person, place, thing, or other object about which the table contains information. Modern database systems execute a variety of query requests (i.e., query functions) concurrently and operate in a dynamic environment of cooperative systems. From time to time on a local database system, it is desired to execute a query function that the particular local database system is not designed with the capability to process. It would be desirable to overcome drawbacks of the local database system, and to provide the local database system with a way of processing query functions that it was not originally designed to process.

SUMMARY

A disclosed embodiment provides an apparatus for facilitating a local database system to execute a query function at a foreign database system. The apparatus comprises a processor of the local database system and a storage device communicatively coupled with the processor. The processor is programmed to (i) receive a query request, (ii) retrieve query data associated with the query request, (iii) determine if the query request can be processed at the local database system, (iv) if the query request is unable to be processed at the local database system, connect to the foreign database system, (v) after the local database system is connected to the foreign database system, export the retrieved query data from the local database system to the foreign database system to allow the foreign database system to process the retrieved query data, (vi) after the retrieved query data has been exported from the local database system to the foreign database system, send the query request from the local database system to the foreign database system to allow the foreign database system to process the query request using the retrieved query data, and (vii) after the foreign database system has processed the query request using the query data, import a result dataset from the foreign database system.

BRIEF DESCRIPTION OF THE DRAWINGS

Aspects of the present disclosure are best understood from the following detailed description when read with the accompanying figures, in which

FIG. 2 is a diagrammatic representation of a parsing engine implemented in accordance with an embodiment.

FIG. 3 is a diagrammatic representation of parser processing in accordance with an embodiment.

FIGS. 4A and 4B are a flowchart that depicts processing of an example routine to facilitate the local database system shown in FIG. 1 to execute a query function at the foreign database system.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
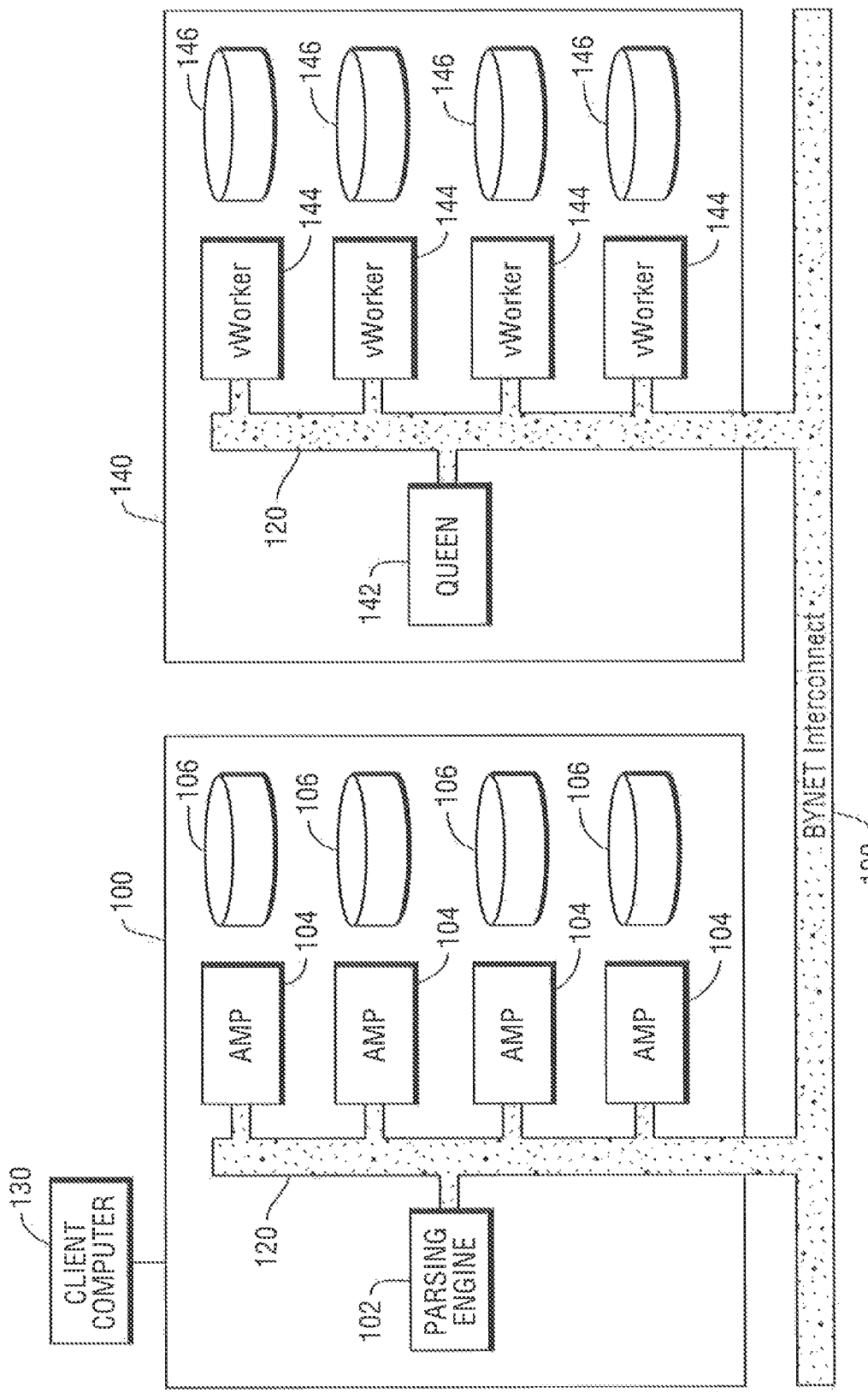
FIG. 1 depicts a diagrammatic representation of an example architecture for a local database system and a foreign database system that are interconnected in accordance with an embodiment.

FIG. 1 depicts a diagrammatic representation of an exemplary architecture for a large, local database system 100 and a foreign database system 140 that are interconnected in accordance with an embodiment. An example local database system 100 comprises the Teradata Active Data Warehousing System, which is commercially available from Teradata Corporation located in Dayton, Ohio. The local database system 100 includes a relational database management system (RDBMS) built upon a massively parallel processing (MPP) system. Other types of database systems, such as object-relational database management systems (ORDBMS) or those built on symmetric multi-processing (SMP) platforms, are also suited for use. The depicted and described architecture is exemplary only and is chosen to facilitate an understanding of the disclosed embodiments.

An example foreign database system 140 comprises the Aster Database System, which is also commercially available from Teradata Corporation. The local database system 100 is connected via an interconnect 120 to the foreign database system 140. The interconnect 120 may comprise any type of network connection that has the capability to facilitate connection between the local database system 100 and the foreign database system 140. An example network connection that can be used is a BYNET connection, which is available from Teradata Corporation. Structure and operation of the BYNET connection are known and, therefore, will not be described.

The local database system 100 includes a parsing engine 102 that is connected via the interconnect 120 to a plurality of virtual Access Module Processors (AMPs) 104. Each of the plurality of AMPs 104 is associated with a corresponding one of a plurality of data storage facilities 106. The parsing engine 102 is a virtual processor (vProc). The local database system 100 also includes external handler software that is used for accessing foreign database systems. The software includes items such as stored procedures and import table operators.

The foreign database system 140 includes a queen server 142 that is connected via the interconnect 120 to a plurality of virtual workers (vWorkers) 144. The queen server 142 manages the distribution of data in a cluster, prepares top-level, partition-aware query plans, issues queries to the vWorkers 144, and assembles query results. The vWorkers 144, in turn, prepare query plans and execute the queries from the queen server 142 in parallel. Each of the plurality of vWorkers 144 is associated with a corresponding one of a plurality of data storage facilities 146.

The parsing engine 102 organizes the storage of data and the distribution of table rows among the plurality of AMPs 104. The parsing engine 102 also coordinates the retrieval of data from the plurality of data storage facilities 106 in response to queries received from a user at a client computer 130. The local database system 100 usually receives queries in a standard format.

In one example system as illustrated in FIG. 2, the parsing engine 102 is made up of four components: a session control 200, a parser 210, an optimizer 215, and a dispatcher 220. The session control 200 provides the logon and logoff function. It accepts a request for authorization to access the local database system 100, verifies it, and then either allows or disallows the access. Once the session control 200 allows a session to begin, a user may submit a request in a standard format, such as the Structured Query Language (SQL), that is routed to the parser 210.

As illustrated in FIG. 3, the parser 210 interprets the SQL request (block 300), checks it for proper SQL syntax (block 310), evaluates it semantically (block 320), and consults a data dictionary to ensure that all of the objects specified in the SQL request actually exist and that the user has the authority to perform the request (block 330). The optimizer 215 then develops the least expensive plan to perform the request.

A series of Access Module Processor Worker Tasks (AWTs) process the requests. An AWT is a thread/task that runs inside of each of the plurality of AMPs 104. An AWT is generally utilized to process requests/queries from users, but may also be triggered or used by internal database software routines, such as deadlock detection.

Pre-allocated AWTs are assigned to each AMP and work on a queue system. That is, each AWT waits for work to arrive, performs the work, and then returns to the queue and waits for more work. Due to their stateless condition, AWTs respond quickly to a variety of database execution needs. At the same time, AWTs serve to limit the number of active processes performing database work within each AMP at any point in time. In other words, AWTs play the role of both expeditor and governor of requests/queries.

AWTs are one of several resources that support the parallel performance architecture within the local database system 100. AWTs are of a finite number, with a limited number available to perform new work on the system. This finite number is an orchestrated part of the internal work flow management. Reserving a special set of reserve pools for single and few-AMP queries may be beneficial for active data warehouse applications, but only after establishing a need exists.

AWTs are execution threads that do the work of executing a query step, once the step is dispatched to the AMP. They also pick up the work of spawned processes, and of internal tasks such as error logging or aborts. When a query step is sent to an AMP, that step acquires a worker task from the pool of available AWTs. All of the information and context needed to perform the database work is contained within the query step. Once the step is complete, the AWT is returned to the pool. If all AWTs are busy at the time the message containing the new step arrives, then the message will wait in a queue until an AWT is free.

The parsing engine 102 enables the foreign database system 140 to be connected via the BYNET connection 120 into the local database system 100 such that the foreign database system 140 looks like a node at the local database system 100. The local database system 100 is facilitated to execute a query function at the foreign database system 140, as will be described herein. Notably, since a query function executing on the foreign database system 140 may be indeterminately long, a mechanism is introduced to release all but one of the AMPs worker thread and signal to start the next step when the foreign function execution at the foreign database system 140 has completed.

To facilitate foreign function execution, export and import table operators are executed in a nested fashion (i.e., an inner table operator exports first and then an outer table operator imports). The export table operator is invoked on all of the AMPs 104 and before the execution of function, exports data from a table of the local database system 100 in parallel using a worker thread of multiple AMPs 104. Multiple tables are exported in sequence. The function execution at the foreign database system 104 may be time consuming and can cause the AWTs to wait a long time before the results can be fetched. Accordingly, a way to release all but one AMP worker thread is provided in accordance with an embodiment.

Initially, an inner export operator step is invoked on all of the AMPs 104. A single control AMP worker thread sets up a connection and sends a Java Data Base Connectivity/Open Data Base Connectivity (JDBC/ODBC) request to start the function on the foreign database system 140 so as to export the data from one or more tables of the local database system 100 in parallel on all of the AMPs 104. Once the data has all been exported, all but the single control AMP worker thread finish and leave. The single control AMP worker thread sends the JDBC request to start the function execution (e.g., sessionize) on the foreign database system 140 and waits for it to finish execution. Any function can be executed, and the name of the function is not required. When completed, it notifies the dispatcher 212 (FIG. 2) to send out the next parallel import step. It then sleeps and waits on a queue for an outer parallel import step to join. The dispatcher 212 then dispatches the next step on all AMP worker threads. The single control AMP wakes up the AMP worker thread of the inner export operator, picks up the same connection, and continues with the parallel import of the function execution result dataset.

More specifically, the single AMP worker thread maintains the connection between the local database system 100 and the foreign database system 140 until the execution of the function is complete. Once completed, a second step is initiated via an internal function interface at the local database system 100. The internal function interface is a coordination control interface and is valid only if the operators execute in parallel. This step internally invokes a routine and enables the single control AMP of the plurality of AMPs 104 to notify the dispatcher 220 (FIG. 2) of the parsing engine 102 to dispatch the next import execution step to perform a parallel import of the result set from the foreign database system 140 using worker threads across all of the AMPs 104 of the local database system 100. This task then pauses and sleeps and waits on a queue until the job can be continued by the AWT executing the parallel import step. The dispatcher 220 carries the VProcID and the task-ID in the import step for the single control AMP to continue the paused task. Afterwards, the AMP worker thread from an outer import operator step picks up the same connection and continues with the parallel import of the result set before completing the task.

It should be apparent that the request is initiated via the JDBC connection, and that the parallel data transfer is accomplished by socket-based connectivity. Installed on the foreign database system 140 are proxy table operators for import and export. A query is executed to retrieve data and it selects the table through a remote operator which uses socket based connectivity to connect to each node of the local database system 100. New Server Grammar table operators allow the two database systems to connect and transfer data between the two database systems. This feature supports full bidirectional parallel data transfer and data mapping between the local database system 100 and the foreign database system 140. A table operator is running on the local database system 100 (one unit of parallelism starts the JDBC query), and is listening at a known port for the remote connection. Once the connection is established and validated for security, data is transferred in a round robin fashion to eliminate skew of data.

It should also be apparent that a mechanism is provided for bidirectional parallel data transfer. This mechanism permits any M×N mapping of end points to perform a data transfer in either direction for any SQL Engine that supports a true table operator. This includes Teradata Active Data Warehousing System and the Aster Database System. Another database system that can support a true table operator is the Hive Database System.

Figure 4A:
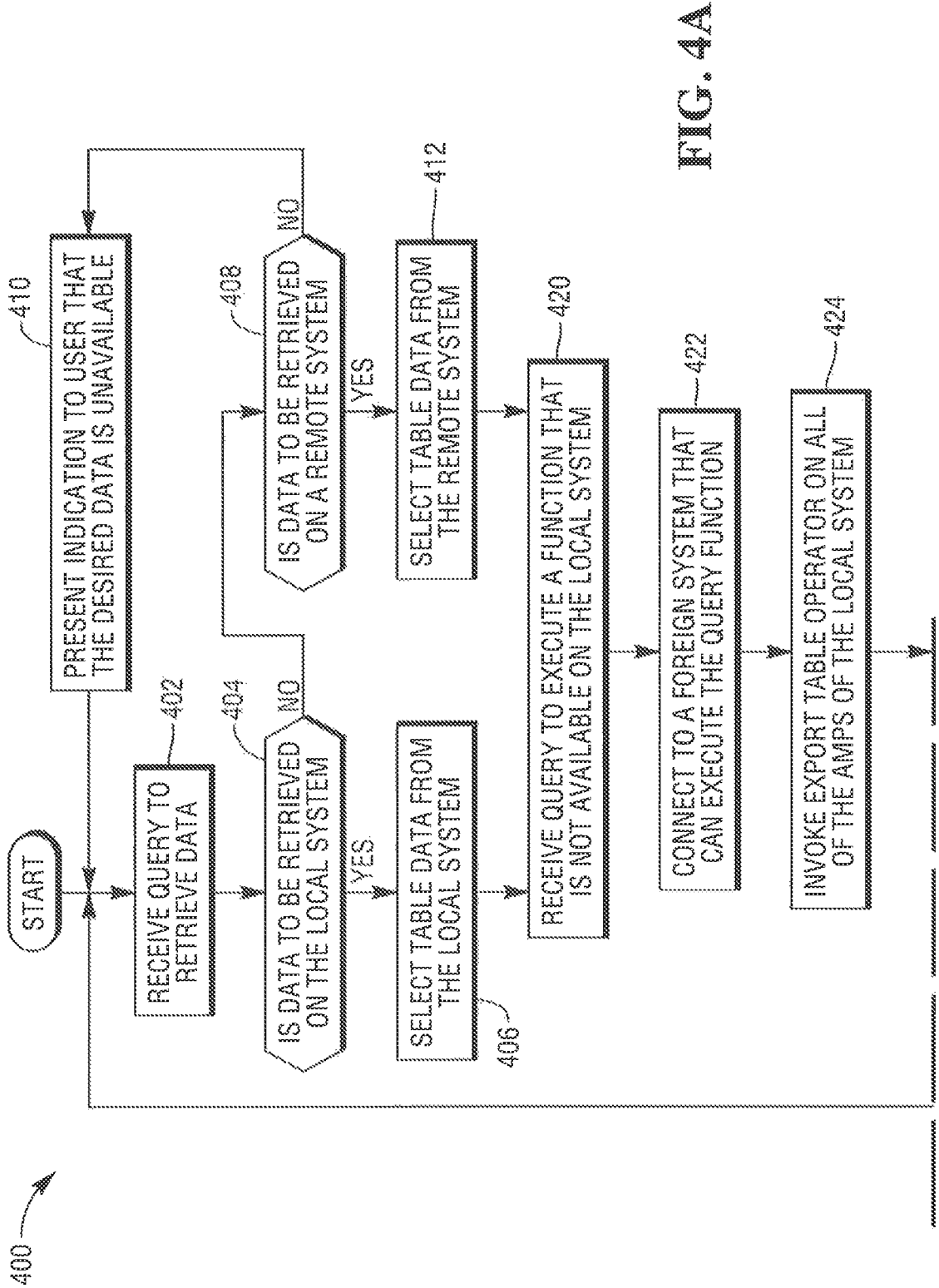

FIGS. 4A and 4B (referred to herein as FIG. 4) is a flowchart 400 that depicts processing of an example routine to facilitate the local database system 100 shown in FIG. 1 to execute a query function at the foreign database system 140. The processing blocks of FIG. 4 may be implemented as computer-executable instructions tangibly embodied on a computer-readable medium executable by a processing system, such as one or more of the processing modules 104 depicted in FIG. 1.

In block 402, the local database system 100 receives a query in which data needs to be retrieved. A determination is made in block 404 as to whether the data to be retrieved is on the local database system 100. If the determination in block 404 is affirmative (i.e., the data to be retrieved is on the local database system 100), then the process proceeds to block 406 in which data is retrieved from tables in the local database system 100. The process then proceeds to block 420. However, if the determination in block 404 is negative (i.e., the data to be retrieved is not on the local database system 100), then the process proceeds to block 408.

In block 408, a determination is made as to whether the data to be retrieved is on a remote database system. As an example, the remote data system may comprise the foreign database system 140 shown in FIG. 1. If the determination in block 408 is negative (i.e., the data to be retrieved is not on the remote database system), then the process proceeds to block 410 in which an indication is presented to alert a user that the data desired to be retrieved is unavailable. However, if the determination in block 408 is affirmative (i.e., the data to be retrieved is on the remote database system), then the process proceeds to block 412 in which data is retrieved from tables in the remote database system. It is conceivable that some optimization may be in place such that if data to be retrieved is from the same remote database system, data is not transferred back but instead a table reference is included in the function execution request. The process then proceeds to block 420.

In block 420, the local database system 100 receives a query request (i.e., a query function) that is unavailable and therefore unable to be executed on the local database system 100. The process then proceeds to block 422 in which the local database system 100 is connected to the foreign database system 140 via the BYNET interconnect 120 (FIG. 1). An export table operator is then invoked on all of the AMPs 104 of the local database system 100, as shown in block 424. The process proceeds to block 425 in which all but one of the AMPs 104 are released. The one AMP not released is a control AMP. Then, in block 426 the control AMP sends a request to the foreign database system 140 to execute the query function that is unable to be executed on the local database system 100. It is conceivable that the request be sent to the foreign database system 140 based upon a preference due to other factors and not just lack of capability of the local database system 100. The process then proceeds to block 428.

In block 428, a determination is made as to whether the foreign database system 140 has processed the query function and the result dataset is ready. If the determination in block 428 is negative (i.e., the result dataset is not ready), the process proceeds to block 430 in which the connection between the local database system 100 and the foreign database system 140 is maintained. The process returns back to block 428 and continues to determine if the result dataset is ready. However, if the determination in block 428 is affirmative (i.e., the result dataset is ready), the process proceeds to block 432.

In block 432, the dispatcher 220 (FIG. 2) of the parsing engine 102 at the local database system 100 in notified to perform a parallel import of the result dataset from the foreign database system 140. The dispatcher 220 then invokes an import table operator on all of the AMPs 104 of the local database system 100 to import the result dataset from the foreign database system 140, as shown in block 434. The process proceeds to block 436 in which an indication is presented to alert a user at the local database system 100 that the result dataset has been imported from the foreign database system 140. The process then proceeds to block 438.

In block 438, a determination is made as to whether there is another query at the local database system 100 to be processed. If the determination is affirmative (i.e., there is another query to be processed), the process returns back to block 402 to process the new query in the same manner as described hereinabove. However, if the determination is negative (i.e., there is not another query to be processed), then the process ends.

It should be apparent from the above description that a user at the local database system 100 is enabled to execute a query function that would otherwise be unavailable to the user at the local database system 100. The query function is exported to the foreign database system 140, which has the capability to execute the query function and provide a result dataset. The local database system 100 then imports the result dataset from the foreign database system 140.

It should also be apparent from the above description that work at the local database system 100 can be off-loaded to a remote database system to use resources of the remote server. As an example, the remote server can be used to execute a function on some data that exists on another system and hence to execute the function on the remote server with co-located data and then bring back the result to the local database system 100. It is conceivable that there may be multiple foreign database systems available, and that a determination can be made of the best foreign database system to execute the function.

It should further be apparent that as part of the parsing shown in FIG. 3, the foreign database system 140 may be accessed to determine the output columns and data types of the function. Also, in block 330 of FIG. 3, data dictionary information that is not available at the local database system 100 is collected and verified from the remote database system 140.

The above-described flowchart 400 of FIG. 4 depicts process serialization to facilitate an understanding of disclosed embodiments and is not necessarily indicative of the serialization of the operations being performed. In various embodiments, the processing steps described in each of the flowcharts above may be performed in varying order, and one or more depicted steps may be performed in parallel with other steps. Additionally, execution of some processing steps of each of the flowcharts above may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer.

The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information.

Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

The text above described one or more specific embodiments of a broader invention. The invention also is carried out in a variety of alternative embodiments and thus is not limited to those described here. For example, while the invention has been described here in terms of a database system that uses a MPP architecture, other types of database systems, including those that use a SMP architecture, are also useful in carrying out the invention. Many other embodiments are also within the scope of the following claims.

What is claimed is:

1. An apparatus for facilitating a local database system to execute a query function at a foreign database system, the apparatus comprising:
    a processor including a plurality of Access Module Processors (AMPs) of the local database system; and
    a storage device communicatively coupled with the processor, wherein the processor is programmed to
    (i) receive a query request;
    (ii) retrieve query data associated with the query request;
    (iii) determine if the query request can be processed at the local database system;
    (iv) if the query request is unable to be processed at the local database system, use one of the plurality of AMPs as a single control processor to connect to the foreign database system;
    (v) after the local database system is connected to the foreign database system, use the single control processor to invoke an export table operator to export the retrieved query data in parallel on all of the AMPs from the local database system to the foreign database system to allow the foreign database system to process the retrieved query data;
    (vi) after the retrieved query data has been exported from the local database system to the foreign database system, release all AMPs but the one of the plurality of AMPs being used as the single control processor;
    (vii) after all AMPs but the one of the plurality of AMPs being used as the single control processor have been released, use the single control processor to send the query request from the local database system to the foreign database system to allow the foreign database system to process the query request using the retrieved query data;
    (viii) after the foreign database system has processed the query request using the query data, import a result dataset from the foreign database system; and
    (ix) receive a signal from the foreign database system indicating that the foreign database system completed processing the query request using the retrieved query data to notify a dispatcher to perform a parallel import of the result dataset from the foreign database system.

2. An apparatus according to claim 1, wherein the processor is further programmed to
    (x) receive a signal from the foreign database system indicating that the foreign database system completed processing the query request using the retrieved query data to notify a dispatcher to invoke an import table operator on all AMPs of the local database system to import the result dataset from the foreign database system.

3. An apparatus according to claim 1, wherein the processor is further programmed to
(x) maintain the connection to the foreign database system while the foreign database system is processing the query request using the retrieved query data.

4. An apparatus according to claim 1, wherein the processor is further programmed to
(x) present an indication to a user that the result dataset has been imported from the foreign database system.

5. A method of facilitating a processor including a plurality of Access Module Processors (AMPs) of a local database system to execute a query function at a foreign database system, the method comprising:
electronically by the processor at the local database system, receiving a query request;
electronically by the processor at the local database system, retrieve query data associated with the query request;
electronically by the processor at the local database system, determining if the query request can be processed at the local database system;
electronically by the processor at the local database system, if the query request is unable to be processed at the local database system, using one of the plurality of AMPs as a single control processor to connect to the foreign database system;
electronically by the processor at the local database system, after the local database system is connected to the foreign database system, using the single control processor to invoke an export table operator to export the retrieved query data in parallel on all of the AMPs from the local database system to the foreign database system to allow the foreign database system to process the retrieved query data;
electronically by the processor at the local database system, after the retrieved query data has been exported from the local database system to the foreign database system, releasing all AMPs but the one of the plurality of AMPs being used as the single control processor;
electronically by the processor, after all AMPs but the one of the plurality of AMPs being used as the single control processor have been released, using the single control processor to send the query request from the local database system to the foreign database system to allow the foreign database system to process the query request using the retrieved query data; and
electronically by the processor at the local database system, after the foreign database system has processed the query request using the query data, importing a result dataset from the foreign database system, wherein electronically by the processor at the local database system, after the foreign database system has processed the query request using the query data, importing a result dataset from the foreign database system includes receiving a signal from the foreign database system indicating that the foreign database system completed processing the query request using the retrieved query data to notify a dispatcher to perform a parallel import of the result dataset from the foreign database system.

6. A method according to claim 5, wherein electronically by the processor at the local database system, after the foreign database system has processed the query request using the query data, importing a result dataset from the foreign database system includes:
receiving a signal from the foreign database system indicating that the foreign database system completed processing the query request using the retrieved query data to notify a dispatcher to invoke an import table operator on all AMPs of the local database system to import the result dataset from the foreign database system.

7. A method according to claim 5, further comprising:
electronically by the processor at the local database system, after the local database system exports the retrieved query data to the foreign database system and before the local database system imports the result dataset from the foreign database system, maintaining the connection to the foreign database system while the foreign database system is processing the query request using the retrieved query data.

8. A method according to claim 5, further comprising:
electronically by the processor at the local database system, after the local database system imports the result dataset from the foreign database system, presenting an indication to a user that the result dataset has been imported from the foreign database system.

9. A method according to claim 5, wherein the method is performed by a computer having a memory executing one or more programs of instructions which are tangibly embodied in a non-transitory program storage medium readable by the computer.

10. An apparatus for facilitating a first database system to execute a query function at a second database system, the apparatus comprising:
a processor including a plurality of Access Module Processors (AMPs) of the first database system; and
a storage device communicatively coupled with the processor, wherein the processor is programmed to
(i) receive a query request;
(ii) retrieve query data associated with the query request;
(iii) determine if the query request can be processed at the first database system;
(iv) if the query request is unable to be processed at the first database system, use one of the plurality of AMPs as a single control processor to connect to the second database system;
(v) after the first database system is connected to the second database system, use the single control processor to invoke an export table operator to export the retrieved query data in parallel on all of the AMPs from the first database system to the second database system;
(vi) after the retrieved query data has been exported from the first database system to the second database system, release all AMPs but the one of the plurality of AMPs being used as the single control processor;
(vii) after all AMPs but the one of the plurality of AMPs being used as the single control processor have been released, use the single control processor to send the query request from the first database system to the second database system to allow the second database system to process the query request using the retrieved query data; and
(viii) after the second database system has processed the query request using the query data, import a result dataset from the second database system by notifying a dispatcher to invoke an import table operator on all AMPs of the first database system to perform a parallel import of the result dataset from the second database system.

11. An apparatus according to claim 10, wherein the processor is further programmed to
(ix) maintain the connection to the second database system while the second database system is processing the query request using the retrieved query data.

12. An apparatus according to claim 10, wherein the processor is further programmed to
(ix) present an indication to a user that the result dataset has been imported from the second database system.

13. A method according to the apparatus of claim 10, wherein the method is performed by the processor having a memory executing one or more programs of instructions which are tangibly embodied in a non-transitory program storage medium readable by the processor.

14. An apparatus according to claim 1, wherein the processor is further programmed to
(x) after the local database system is connected to the foreign database system, use the single control processor to send a Java Data Base Connectivity/Open Data Base Connectivity (JDBC/ODBC) request to start function execution on the foreign database system.

15. A method according to claim 5, further comprising:
electronically by the processor at the local database system, after the local database system is connected to the foreign database system, use the single control processor to send a Java Data Base Connectivity/Open Data Base Connectivity (JDBC/ODBC) request to start function execution on the foreign database system.

16. An apparatus according to claim 10, wherein the processor is further programmed to
(ix) after the local database system is connected to the foreign database system, use the single control processor to send a Java Data Base Connectivity/Open Data Base Connectivity (JDBC/ODBC) request to start function execution on the foreign database system.

* * * * *